(12) United States Patent
Cessot et al.

(10) Patent No.: US 11,380,499 B2
(45) Date of Patent: Jul. 5, 2022

(54) SYNCHRONISED MOVEMENT OF A BISTABLE DEVICE, FROM A MULTITUDE OF MONOSTABLE LEVERS

(71) Applicants: LEGRAND FRANCE, Limoges (FR); LEGRAND SNC, Limoges (FR)

(72) Inventors: Stéphane Cessot, Saint Priest (FR); Marcel Daccord, Condat sur Vienne (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 0 days.

(21) Appl. No.: 16/971,057

(22) PCT Filed: Jan. 18, 2019

(86) PCT No.: PCT/FR2019/050101
§ 371 (c)(1),
(2) Date: Aug. 19, 2020

(87) PCT Pub. No.: WO2019/170968
PCT Pub. Date: Sep. 12, 2019

(65) Prior Publication Data
US 2020/0381199 A1      Dec. 3, 2020

(30) Foreign Application Priority Data

Mar. 8, 2018 (FR) ...................................... 1852015

(51) Int. Cl.
*H01H 23/16* (2006.01)
*F16B 1/00* (2006.01)
(Continued)

(52) U.S. Cl.
CPC .............. *H01H 23/16* (2013.01); *F16B 1/00* (2013.01); *F16H 21/44* (2013.01); *G05G 1/04* (2013.01);
(Continued)

(58) Field of Classification Search
CPC ...... H01H 23/145; H01H 23/16; H01H 19/14; H01H 23/14; H01H 23/24; H01H 23/02;
(Continued)

(56) References Cited

U.S. PATENT DOCUMENTS 2,295,484 A * 9/1942 Krieger .................. H01H 13/60
200/457
3,491,218 A * 1/1970 Robbins .................. H01H 13/60
200/457
(Continued)

FOREIGN PATENT DOCUMENTS

DE       19713978 A1    10/1997
EP        0505382 A1     9/1992
FR         364525 A      3/1906

OTHER PUBLICATIONS

International Search Report for corresponding application PCT/FR2019/050101 filed Jan. 18, 2019; dated Apr. 1, 2019.

*Primary Examiner* — Ahmed M Saeed
(74) *Attorney, Agent, or Firm* — Cantor Colburn LLP

(57) ABSTRACT

A bistable device including a fixed baseplate, at least two levers, a tappet rigidly secured to between each lever and the baseplate and aligned in a first direction, where a lever is capable of displacement relative to the baseplate so as to displace the associated tappet substantially in translation in the first direction, and a member that is able to take two positions, the device additionally including a rocker associated with each lever, arranged between the baseplate and the associated tappet, including two V-shapes facing the associated tappet, where the associated tappet in the first V-shape tends to turn the associated rocker in a first direction and the associated tappet in the second V-shape tends to turn the associated rocker in a second direction opposite to the first (Continued)

direction, the rockers being synchronized in rotation and the rockers being synchronized with the member.

14 Claims, 9 Drawing Sheets

(51) Int. Cl.
    *F16H 21/44*     (2006.01)
    *G05G 1/04*     (2006.01)
    *G05G 5/05*     (2006.01)
    *H01H 23/14*     (2006.01)
    *H01H 23/24*     (2006.01)

(52) U.S. Cl.
    CPC ............... *G05G 5/05* (2013.01); *H01H 23/14* (2013.01); *H01H 23/24* (2013.01); *F16B 2001/0064* (2013.01); *G05G 2505/00* (2013.01)

(58) Field of Classification Search
    CPC ........... H01H 2221/016; H01H 23/143; H01H 23/003; H01H 23/30; H01H 23/00; H01H 13/60; H01H 3/42; F16B 1/00; F16B 2001/0064; F16H 21/44; G05G 1/04; G05G 5/05; G05G 2505/00
    See application file for complete search history.

(56)     References Cited

U.S. PATENT DOCUMENTS

| | | | | |
|---|---|---|---|---|
| 3,746,809 | A * | 7/1973 | Gaber | H01H 23/166 200/436 |
| 5,510,583 | A * | 4/1996 | Pescetto | H01H 23/003 200/1 B |
| 10,490,371 | B2 * | 11/2019 | Weh | H01H 21/24 |
| 2008/0142349 | A1 * | 6/2008 | Lafontaine | H01H 13/72 200/5 B |

* cited by examiner

[Fig. 1]
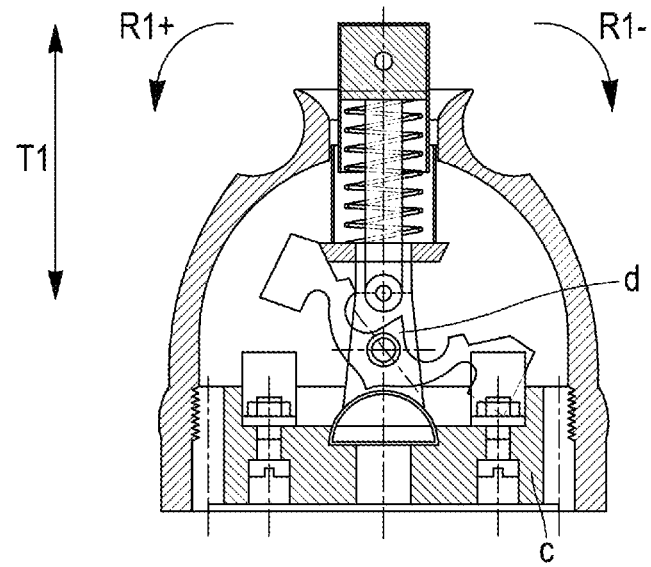
[Fig. 2]
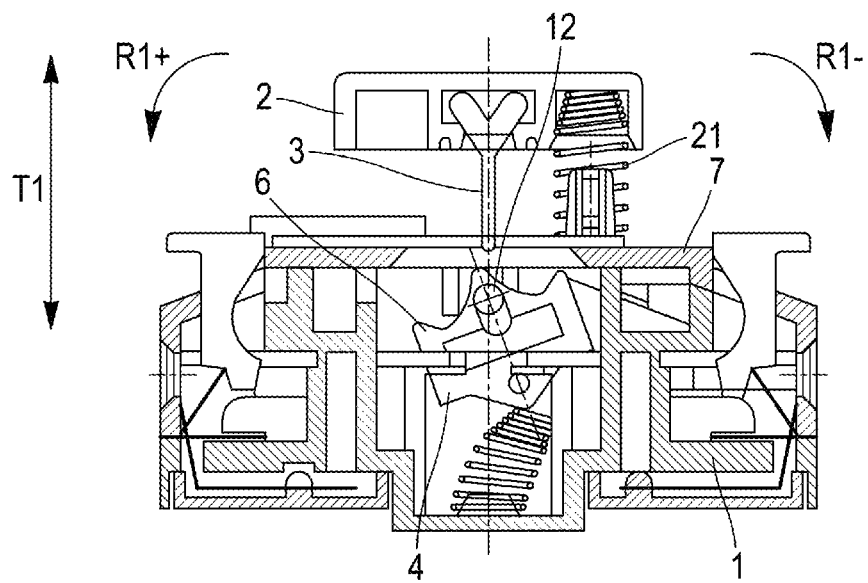

[Fig. 3]
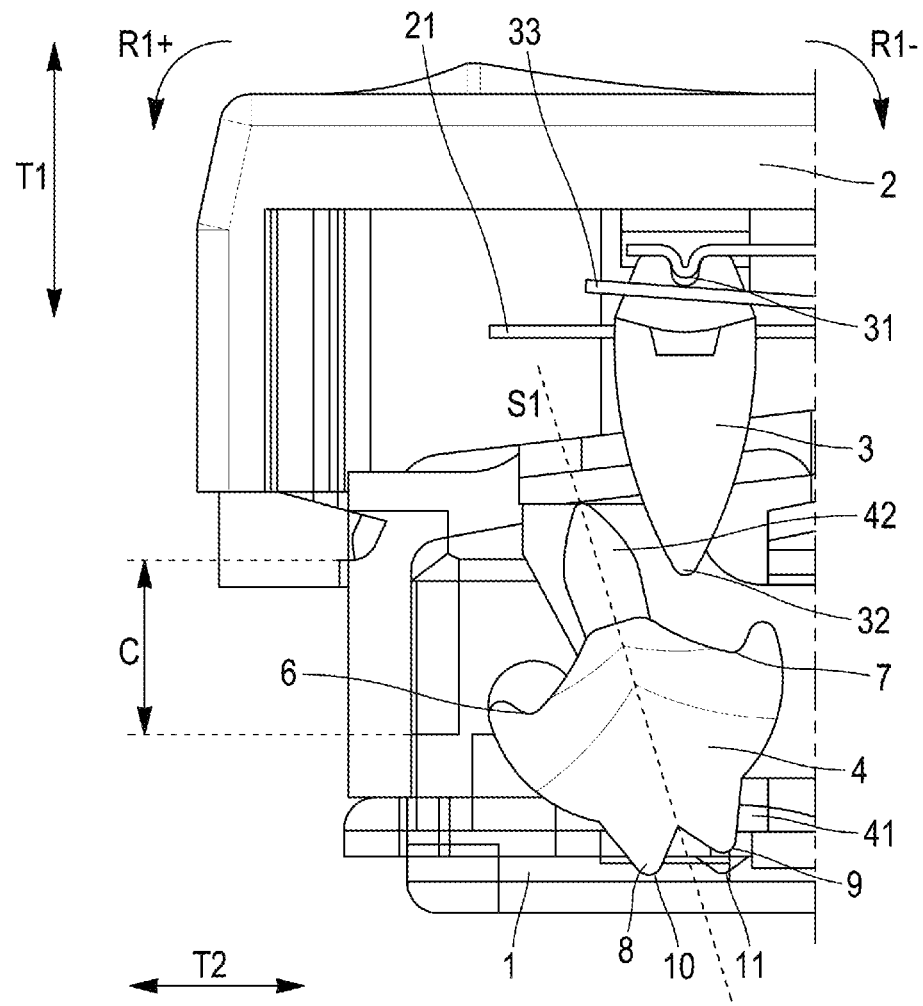
[Fig. 4]
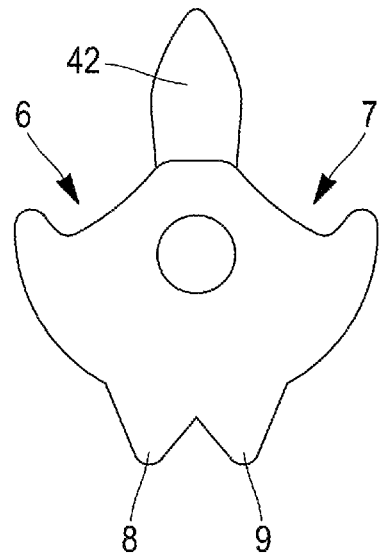

[Fig. 5]
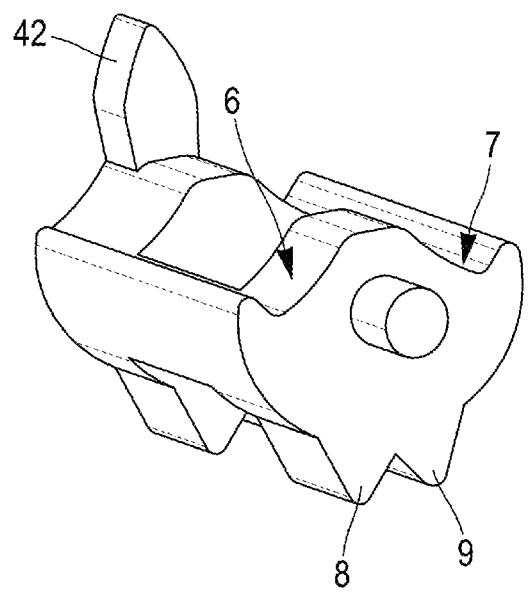
[Fig. 6]
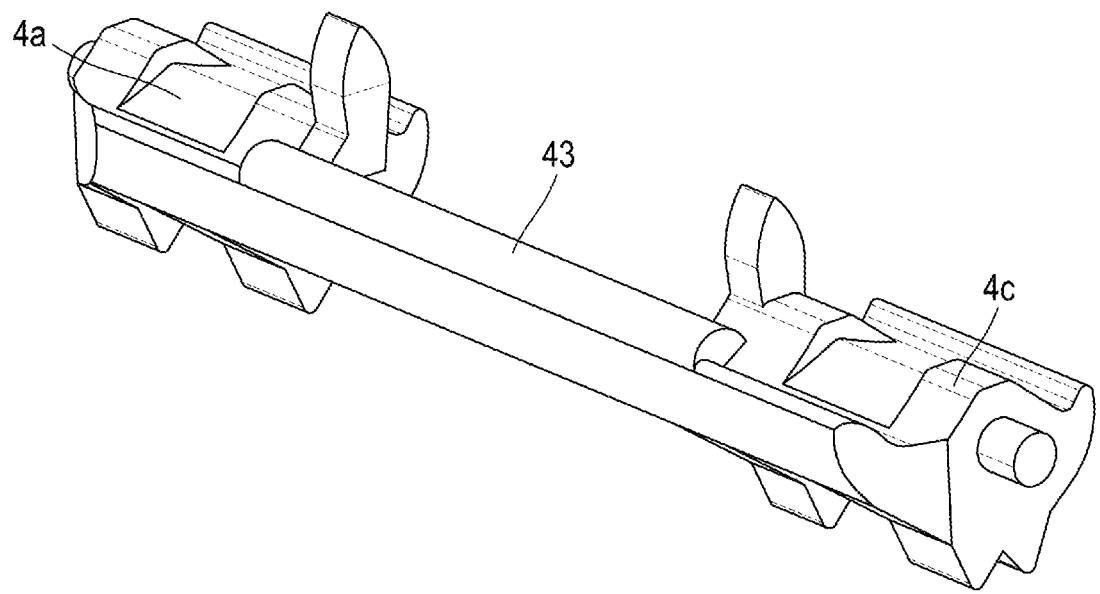

[Fig. 7]
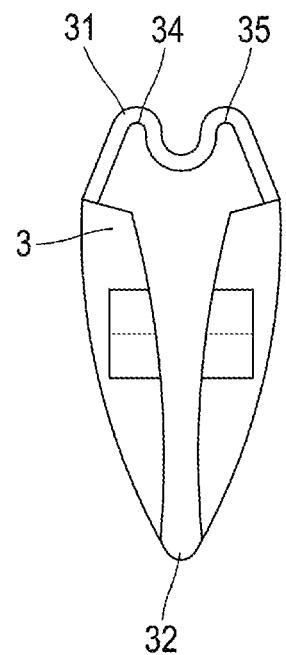
[Fig. 8]
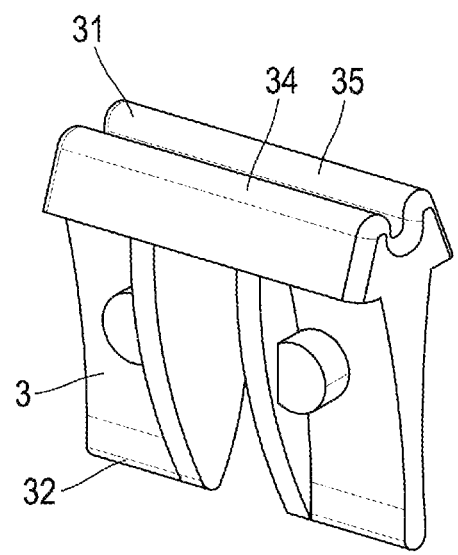

[Fig. 9a]
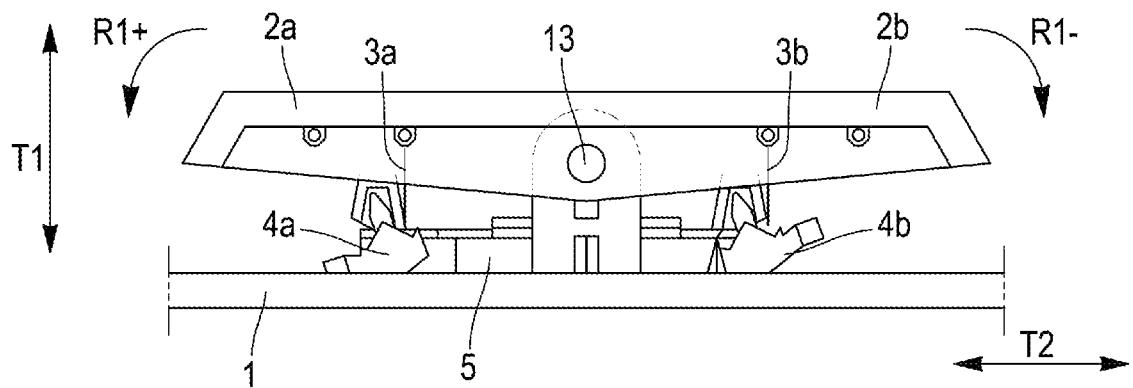
[Fig. 9b]
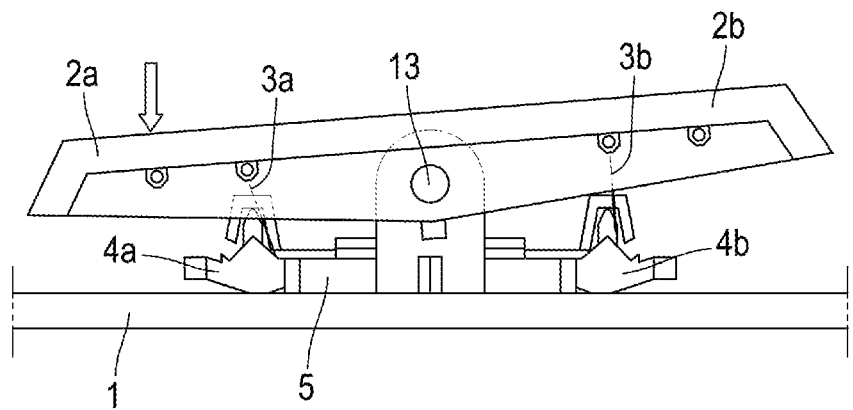
[Fig. 9c]
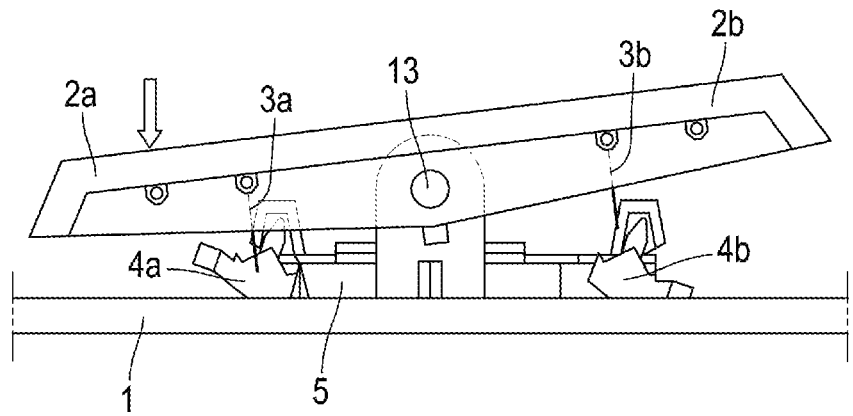

[Fig. 9d]
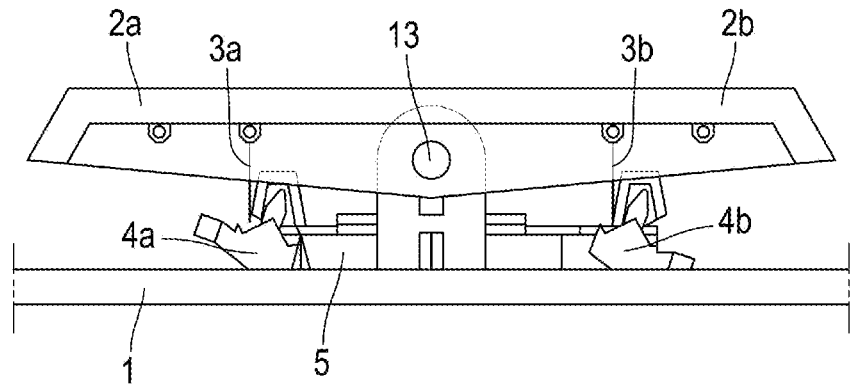
[Fig. 10a]
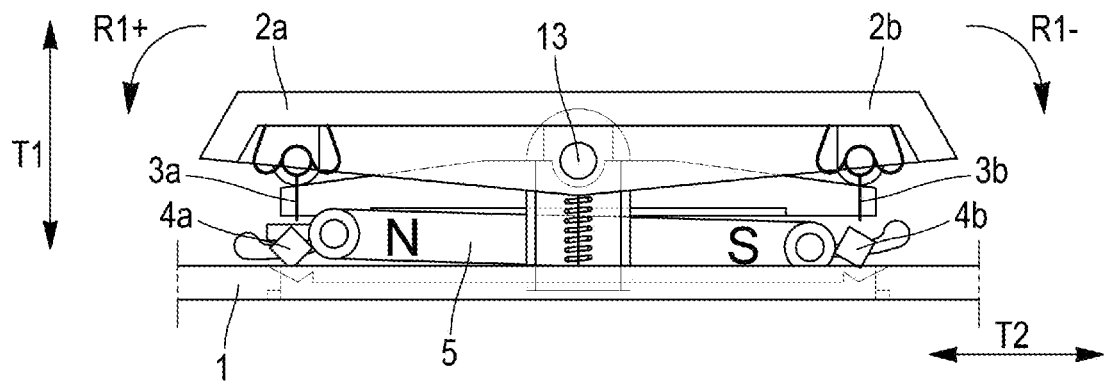
[Fig. 10b]
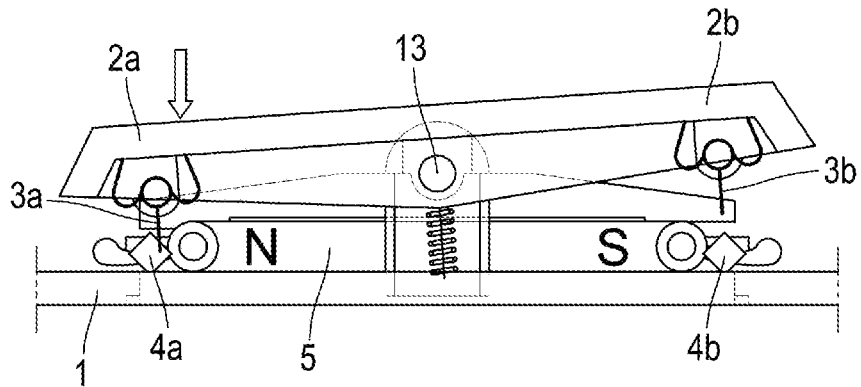

[Fig. 10c]
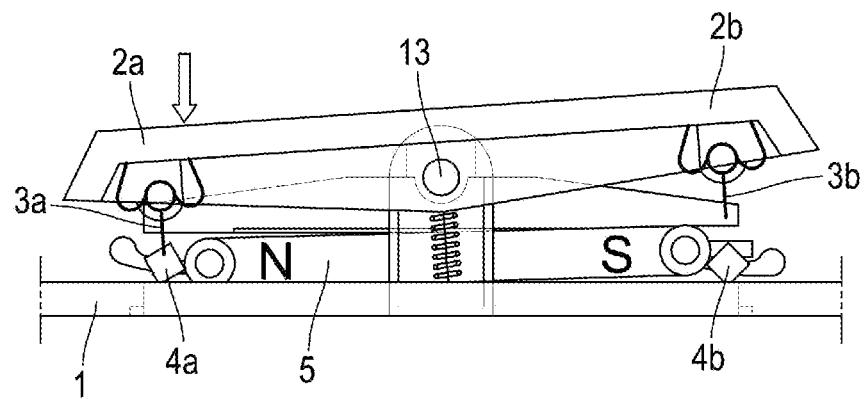
[Fig. 10d]
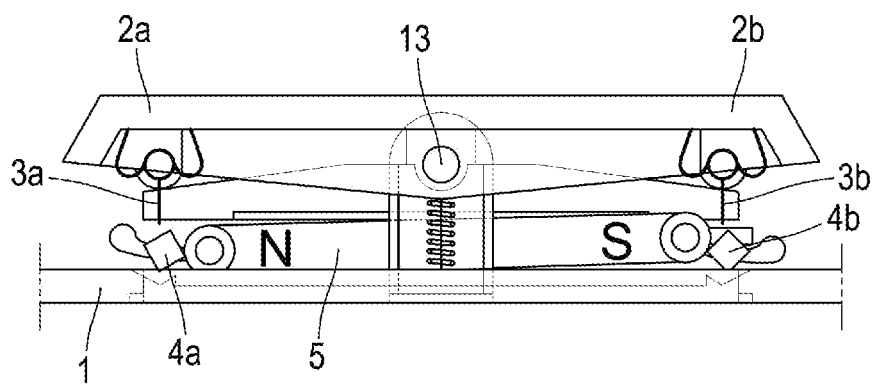

[Fig. 11]
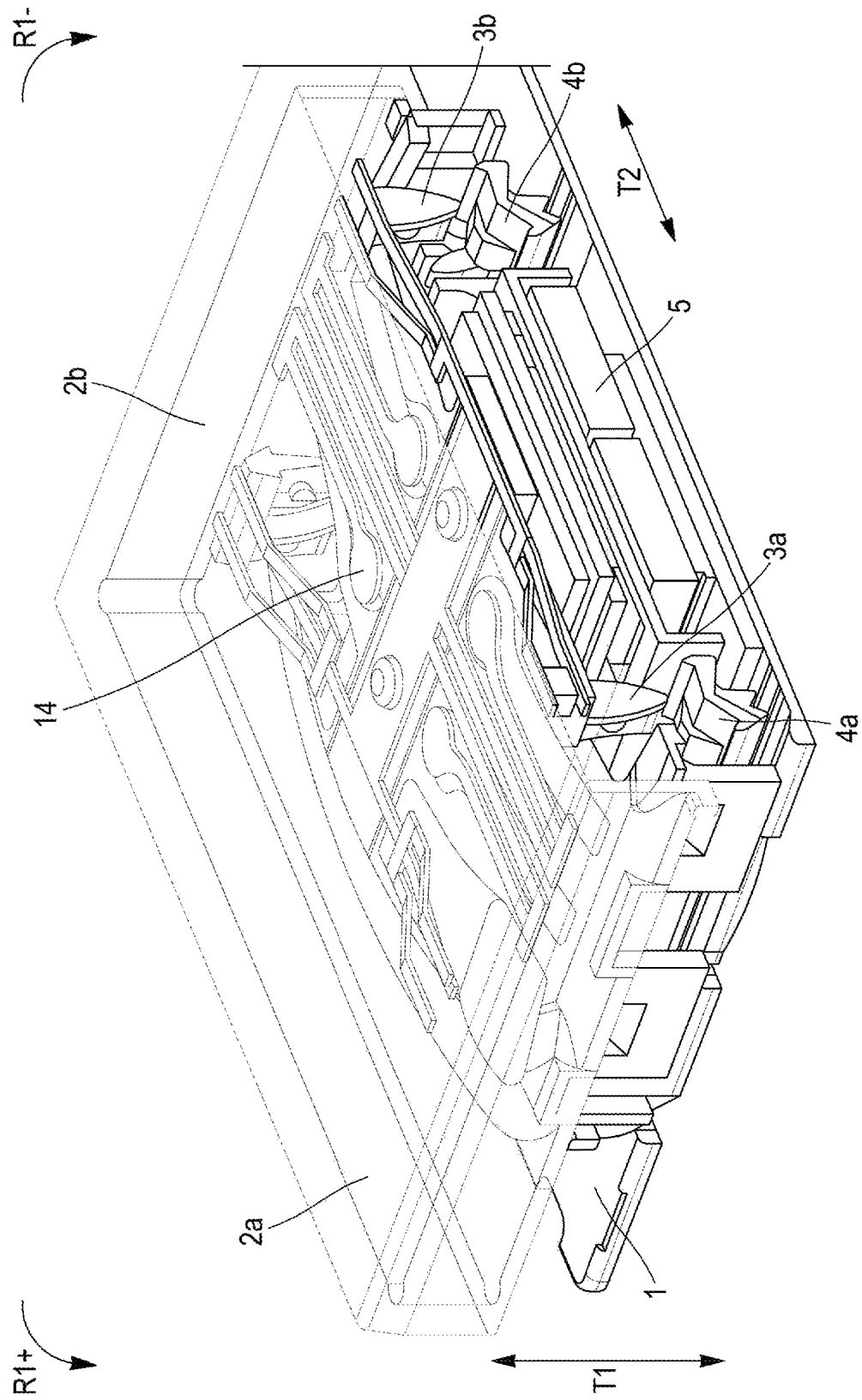

[Fig. 12]
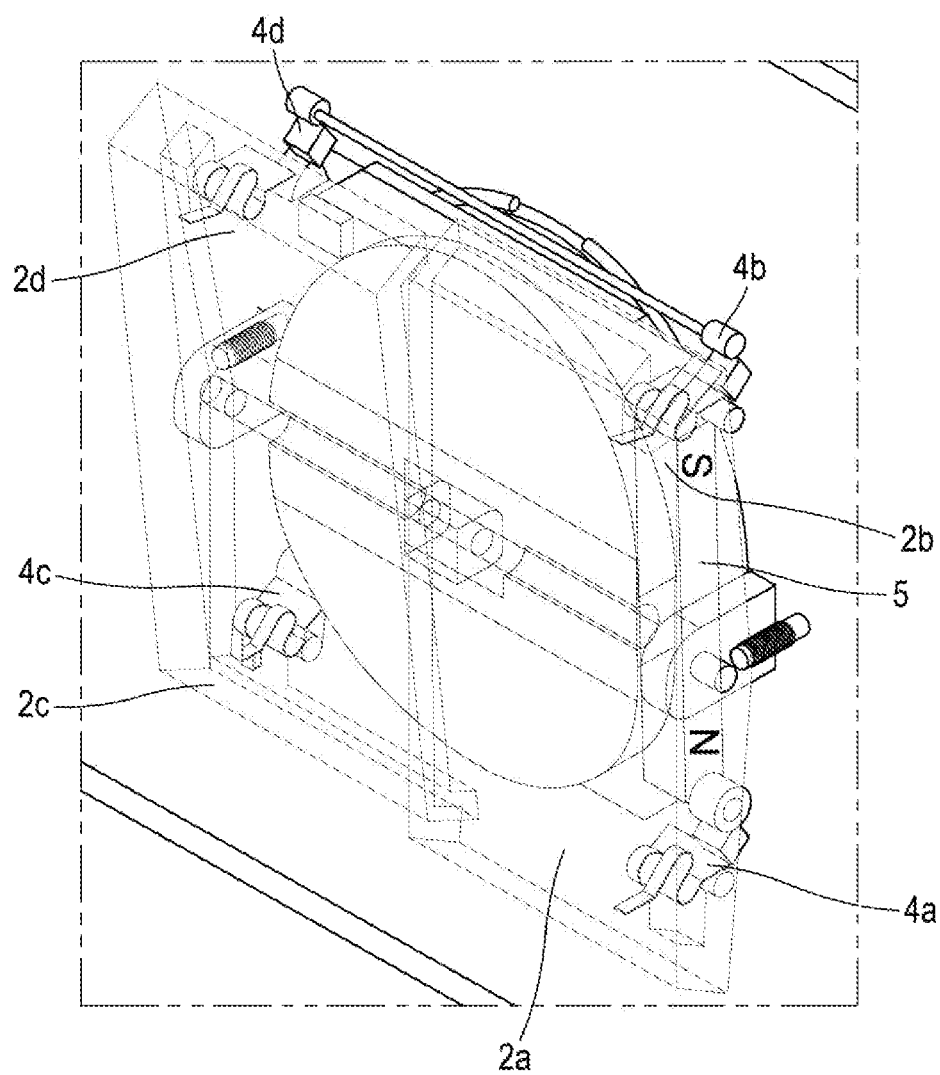

SYNCHRONISED MOVEMENT OF A BISTABLE DEVICE, FROM A MULTITUDE OF MONOSTABLE LEVERS

TECHNICAL FIELD

The present disclosure relates to a bistable device. Such a device can occupy two distinct and advantageously maintained positions. At least one lever, advantageously monostable, makes it possible, advantageously by means of the same maneuver, to modify the position of the device in order to switch from the first position to the second or from the second position to the first position.

BACKGROUND

It is desired to carry out a device comprising at least two levers and such that each maneuver of any among the levers causes a change in the position of a member that can have two positions in a reversible manner. The member can for example be an electric generator that produces, at each change in position, the energy required for the operation of the device.

As the movement of the member has to be reversible it can be considered to carry out a monostable device. Thus a maneuver of any one among the levers causes a change in the position of the member. The releasing of the lever causes a change in the inverse position of the lever and in the member which return to their original position, typically under the action of a return means, retuning the lever and the member. Such a configuration has at least the following disadvantages. The member, when it is a generator, is resistant and requires a substantial force to carry out a change in position. The return means that has to carry out the returning of the member has to be dimensioned in consequence. In addition, during the maneuver the force is at least doubled in that it has to displace the member and in addition oppose the return means that has to be able to return it to the initial position. In addition in the case of a generator, energy is generated during the return, which most often is not pertinent.

Therefore a solution is sought based on a bistable device, that can be controlled by several monostable levers. Such a solution, where the member is bistable, makes it possible to return only the lever, and thus clearly reduce the capacity of the return means and the maneuver force.

It is known, for example from FR 364525 or from EP 0505682, to use a rocker to carry out a bistable device, controlled by a monostable lever.

Such as shown in FIG. 1, such a device comprises a fixed baseplate c, a lever a, a tappet f and a rocker h. The tappet f is integral with the lever a, disposed between the lever a and the baseplate c, substantially aligned in a first direction T1. The lever a is able to be displaced, relative to the baseplate c, so as to displace the tappet f substantially in translation in the first direction T1. The rocker h, disposed between the baseplate c and the tappet f, comprises two V-shapes k, k' which face the tappet f. The rocker h is articulated relative to the baseplate c by means of an axis d.

The lever a, and with it the tappet f, can be displaced according to a first direction T1 and is returned to the high position. The rocker h is initially in a first position wherein the first V-shape k is facing the tappet f. A first descending touch on the lever causes a displacement of the tappet f which bears against the facing V-shape, here the first V-shape k. A touch of the tappet f in the first V-shape k tends to turn the rocker h in a first direction R1+ until a second position is reached wherein the second V-shape k' is facing the tappet f. A second touch descending on the lever causes a displacement of the tappet f which bears against the facing V-shape, now the V-shape k'. A touch of the tappet f in the second V-shape k' tends to turn the rocker h in a second direction R1− opposite to the first direction R1+. Doing this the rocker h is placed back to its original position, such as shown in FIG. 1, the first V-shape k is again facing the tappet f. A same maneuver of the lever thus makes it possible to displace the rocker h alternatively from the first position to the second position and from the second position to the first position.

FIG. 2 shows a similar device comprising a fixed baseplate 1, a lever 2 comprising a return means 21, a tappet 3 and a rocker 4. The rocker 4 comprises two V-shapes 6, 7. The rocker 4 is articulated relative to the baseplate 1 by means of a shaft 12.

The prior art does not comprise as far as we know any disclosure of a bistable device that can be controlled indifferently by several levers.

BRIEF SUMMARY

The bistable device of the disclosure aims to overcome all or a portion of the disadvantages of the prior art and aims in particular to propose a bistable device where any maneuver of one of the levers causes a change in the position of the member.

The disclosure has for object a bistable device comprising a fixed baseplate, at least two levers, a tappet associated with each lever, integral with said lever, disposed between the lever and the baseplate, substantially aligned in a first direction, a lever able to be displaced, relative to the baseplate, so as to displace the associated tappet substantially in translation in the first direction and a member able to take two positions, the device further comprising a rocker associated with each lever, disposed between the baseplate and the associated tappet, comprising two V-shapes which face the associated tappet, a touch of the associated tappet in the first V-shape tending to turn the associated rocker in a first direction and a touch of the associated tappet in the second V-shape tending to turn the associated rocker in a second direction opposite to the first direction, all the rockers being synchronized in rotation and the rockers being synchronized with the member.

Thus, each maneuver/touch on any one of the monostable levers, causes a change in the position of the member, directly causes a change in the position of the associated rocker and by mechanical connection causes a change in position of all the other rockers. The member is actuated reversibly and repeated, regardless of the lever maneuvered.

According to another characteristic two rockers turning around the same axis of rotation are synchronized by a shaft connecting the two rockers, preferably the two rockers and the shaft are made from the same material.

According to another characteristic two rockers turning around separate axes of rotation are synchronized by a means of transmission, preferably confounded with the member.

According to another characteristic the two positions of the member are rotatable around an axis perpendicular to the first direction or translatable in a second direction perpendicular to the first direction.

According to another characteristic the relative disposition of the V-shapes of a rocker and the stroke of the associated tappet as such that the rotation of the rocker obtained by touching the associated tappet in the first V-shape tends to place the second V-shape facing the tappet in the idle position: substantially aligned with the first direction, and the rotation of the rocker obtained by touching the associated tappet in the second V-shape tends to place the first V-shape facing the associated tappet in the idle position.

According to another characteristic the V-shapes are moved away in a second direction substantially perpendicular to the first direction, so that a rocker turns, relative to the baseplate, around a first axis of rotation substantially perpendicular to the first direction and to the second direction.

According to another characteristic a rocker further comprises two feet, which face the baseplate and the baseplate comprises two gutters each able to receive one of said feet rotatably.

According to another characteristic a rocker is substantially symmetric relative to an axis of symmetry, substantially aligned with the first direction.

According to another characteristic the axes of rotation of the rockers are parallel.

According to another characteristic the rockers are similar and/or the tappets are similar.

According to another characteristic a lever comprises a return means tending to move the lever away from the associated rocker.

According to another characteristic a tappet is able to be displaced, relative to the associated lever, in rotation about a second axis substantially parallel to the first axis and preferably comprises a return means in the idle position.

According to another characteristic at least one rocker and/or the member comprises at least one return means tending to place said at least one rocker and/or the member in one of the two positions thereof.

According to another characteristic a touch on a lever actuates an individualized electrical contact.

BRIEF DESCRIPTION OF THE FIGURES

Other innovative characteristics and advantages of the disclosure shall appear when reading the description hereinafter, provided for information purposes and in no way limiting, in reference to the accompanying drawings, wherein:

FIG. 1, already described, shows a bistable device according to the prior art,

FIG. 2, already described, shows another bistable device according to the prior art, FIG. 3 shows, as a front view, a detail of an embodiment of the bistable device of the disclosure, FIG. 4 shows, as a front view, an embodiment of a rocker, FIG. 5 shows, as a perspective view, the rocker of FIG. 6, FIG. 6 shows, as a perspective view, another embodiment of a rocker, FIG. 7 shows, as a front view, an embodiment of a tappet, FIG. 8 shows, as a perspective view, the tappet of FIG. 8, FIGS. 9a-d show, as a front view, the actuating sequence of a bistable device, the member being translated, FIGS. 10a-d show, as a front view, the actuating sequence of a bistable device, the member being rotatable, FIG. 11 shows as a perspective view an embodiment of a bistable device comprising 2 levers, FIG. 12 shows as a perspective view an embodiment of a bistable device comprising 4 levers.

For increased clarity, identical or similar elements are marked with identical reference signs in all of the figures. A numerical reference sign designates a single or generic component. A literal sign attached specifies the particular component. Thus 2 designates a single lever or generically all the levers 2a, 2b, etc. 2a designates a particular lever. The same literal sign refers to associated components. Thus the tappet 3b is associated with the lever 2b.

DETAILED DESCRIPTION

Such as shown in FIGS. 9-12, a bistable device according to the disclosure comprises a fixed baseplate 1, at least two levers 2a, 2b, a tappet 3a, 3b associated with each lever 2a, 2b, integral with said lever 2a, 2b, disposed between the lever 2a, 2b and the baseplate 1, substantially aligned in a first direction T1, a lever 2a, 2b able to be displaced, relative to the baseplate 1, so as to displace the associated tappet 3a, 3b substantially in translation in the first direction T1 and a member 5 able to take two positions.

In order to carry out the bi-stability function of the disclosure a rocker 4a, 4b is associated with each lever 2a, 2b, disposed between the baseplate 1 and the associated tappet 3a, 3b.

A rocker 4a, 4b is disposed between the baseplate 1 and the associated tappet 3a, 3b. A rocker 4a, 4b comprises two V-shapes 6, 7 which face the associated tappet 3a, 3b. Such as more particularly shown in FIG. 3, and in accordance with the known use of a rocker 4, the V-shapes 6, 7 are shaped and disposed in such a way that a touch of the tappet 3 in the first V-shape 6 tends to turn the rocker 4 in a first direction R1+ and a touch of the tappet 3 in the second V-shape 7 tends to turn the rocker 4 in a second direction R1− opposite to the first direction R1+.

According to another characteristic of the disclosure all the rockers 4a, 4b are synchronized in rotation. Thus when a rocker 4 changes angular position, all the other rockers 4 also change angular position. In addition the rockers 4a, 4b are synchronized with the member 5. Thus each maneuver/touch on any one of the levers 2a, 2b, directly causes a change in the position of the associated rocker 4a, 4b and, by mechanical connection, causes a change in the position of the member 5 and a chain in the position of all the other rockers 4a, 4b. The member 5 is actuated in a reversible manner and repeated, at each maneuver, regardless of the lever 2a, 2b maneuvered.

The synchronization is typically carried out by a mechanical connection. This mechanical connection can have several forms.

According to a first form, applicable to two rockers 4a, 4c turning around the same axis of rotation, the synchronization can be carried out by a shaft 43 connecting the two rockers 4a, 4c. The connection is here a rigid connection, the two rockers 4a, 4c being of a single piece. Such as shown in FIG. 6, according to a preferred embodiment two rockers 4a, 4c and the shaft 43 are made from the same material.

According to another form, applicable to two rockers 4a, 4b turning around separate axes of rotation, the synchronization can be carried out by a means of transmission. This means of transmission can be of any type. According to an embodiment, the means of transmission is a link-rod able to transmit in translation the rotating movement of a rocker 4a to another rocker 4b. According to another embodiment the means of transmission is a link-rod/a rotator, rotating where applicable about a shaft, able to transmit in rotation the rotating movement of a rocker 4a to another rocker 4b. According to an embodiment more particularly shown in FIGS. 9a-d (translatable case) or in FIGS. 10a-d (rotatable case), the member 5 is advantageously used as a means of transmission.

According to another characteristic, the two positions of the member 5 are rotatable in that they are deduced from one another by a rotation about an axis perpendicular to the first direction T1. This axis of rotation is advantageously parallel to an axis of rotation R1 of the rockers 4a, 4b. This is more particular shown in FIGS. 10a-d.

According to another characteristic, the two positions of the member 5 are translatable in that they are deduced from one another by a translation in a second direction T2 perpendicular to the first direction T1. This is more particular shown in FIGS. 9a-d.

According to another characteristic of the disclosure the relative disposition of the V-shapes 6, 7 of a rocker 4 and the stroke of the associated tappet 3 are such that the rotation of the rocker 4 obtained by touching the associated tappet 3 in the first V-shape 6 tends to place the second V-shape 7 facing the associated tappet 3 in the idle position. A tappet 3 is in the idle position when it is substantially aligned with the first direction T1. Thus when a tappet 3 returns to the idle position, after having carried out a touch in the first V-shape 6, said touch caused a rotation of the associated rocker 4 such that the second V-shape 7 is now facing the tappet 3. Thus another touch of the associated tappet 3 will encounter the second V-shape 7.

Reciprocally, the rotation of a rocker 4 obtained by touching the associated tappet 3 in the second V-shape 7 tends to place the first V-shape 6 facing the associated tappet 3 in the idle position. This confers a reversibility to a rocker 4 and consequently to the bistable device.

According to another characteristic of the disclosure the V-shapes 6, 7 are moved away in the same second direction T2 substantially perpendicular to the first direction T1. Thus the movement of a rocker 4, relative to the baseplate 1, describes a rotation around a first axis R1 of rotation substantially perpendicular to the first direction T1 and to the second direction T2, or perpendicular to the plane of FIG. 3.

According to another characteristic, shown for example in FIG. 3, a rocker 4a, 4b comprises two feet 8, 9 and the baseplate 1 comprises two equivalent gutters 10, 11. The feet 8, 9 are disposed in such a way as to face the baseplate 1. In other words, the feet 8, 9 are disposed on the rocker 4 on the side opposite the V-shapes 6, 7. The gutters 10, 11 are disposed in such a way as to each be able to receive one of said feet 8, 9.

The shape of a foot 8, 9 and the shape of a gutter 10, 11 are such that a foot in contact with a gutter can turn relative to the gutter. For this a foot has for example an outward dihedron shape, while the gutter has an inward dihedron of greater aperture. Alternatively one foot has, such as shown, an outward circular shape, while the gutter has an inward dihedron or, such as shown, an inward circular shape, with a diameter substantially equal or greater than that of a foot.

When a foot 8, 9 is in contact with its equivalent gutter 10, 11, the rocker 4, 4a, 4b rotates around an axis R1 that is confounded with the (center of the) foot 8, 9. The position of the first axis R1 of rotation of the rocker 4 is thus advantageously variable.

This advantageous configuration allows a rocker 4, 4a, 4b, during its movement of rotation, to change the foot 8, 9 by touch and thus modify the position of the axis R1 of rotation. According to its position a rocker 4, 4a, 4b has one of the V-shapes 6, 7 facing the associated tappet 3a, 3b. The rocker 4a, 4b is then touching the foot 8, 9 the farthest from the V-shape 6, 7 presented. Thus in the position shown in FIG. 3, the rocker 4 has the second V-shape 7 and is touching the first foot 8. In the other position thereof, the rocker has the first V-shape 6 and is touching the second foot 9. This makes it possible to have appear in the action line of the tappet 3 a substantial lever arm which increases by as much the reduction and prevents any risk of blockage.

According to another characteristic of the disclosure the distance between the gutters 10, 11 is substantially equal to the distance between the feet 8, 9. These distances are measured along the second direction T2. This allows each one of the feet 8, 9 to be housed in its equivalent gutter 10, 11 during the rotation of the rocker 4.

According to a preferred embodiment, a rocker 4, 4a, 4b is substantially symmetric relative to an axis S1 of symmetry, substantially aligned with the first direction T1. It ensures that the V-shapes 6, 7 have shapes and dispositions that are substantially symmetric relative to the axis S1 of symmetry. It further ensues that the feet 8, 9 have forms and dispositions that are substantially symmetric relative to the axis S1 of symmetry.

In order to simplify the realization of the means of synchronization, the axes of rotation of the rockers 4a, 4b are preferably parallel to one another.

With a concern for simplifying the kinetics and a reduction in the number of different parts, the rockers 4a, 4b are preferably similar. Likewise the tappets 3a, 3b are preferably similar.

According to another characteristic, a lever 2a, 2b comprises a return means 21 tending to move the lever 2a, 2b away from the associated rocker 4a, 4b. Thus a lever 2a, 2b is monostable.

In the embodiment shown, where the same rocking part forms a first lever 2a and a second lever 2b, at each one of its ends, the return means 21 can be common to the two levers 2a, 2b.

Such a return means 21 having only to mobilize the lever or levers 2a, 2b relatively light and not the member 5, can be dimensioned lightly in consequence.

A lever 2 is typically maneuvered by a touch, typically manual, along T1, from top to bottom in the plane of FIG. 3. This touch opposes the return means 21 and drives the associated tappet 3 in a movement that brings it closer to the associated rocker 4. When the touch on the lever 2 ceases, the return means 21 returns the lever 2 to its high or idle position and with it the tappet 3.

According to another characteristic, so as to be able to better off-center and come into one of the associated V-shapes 6, 7, a tappet 3 is able to be displaced, relative to the associated lever 2, in rotation about a second axis substantially parallel to the first axis R1.

Alternatively the off-centering function can be carried out by deformation of the tappet 3.

According to a preferred embodiment, shown in FIGS. 3, 7, 8 a rotation of the tappet 3 can be carried out, like the rotation of the rocker 4, by means of two lobes 34, 35, comparable to the two feet 8, 9 cooperating with two equivalent gutters made in the lever 2, comparable to the two gutters 10, 11.

For a tappet 3 able to be displaced in rotation, a return means 33 advantageously makes it possible to return the tappet 3 to the idle position.

According to another characteristic, a rocker 4, 4a, 4b comprises at least one return means 41 tending to place the rocker 4 in one of its extreme rotation positions. This return means 41 makes it possible to reinforce the bi-stability of the rocker 4 by immobilizing the rocker 4 in its two positions. It in addition provides a resistant force at the beginning of rotation of the rocker 4 which, transmitted by the lever 2, provides the operator with a tactile sensation. On the contrary, at the end of the rotation of the rocker 4 the return means 41 accompanies the movement by reducing the maneuvering force. This allows for an acceleration of the end of the maneuver carrying out a brief triggering.

Due to the synchronization of the rockers 4a, 4b and of the member 5, the return means 41 can be applied on one of the rockers 4a, 4b, over several of the rockers 4a, 4b and/or on the member 5.

According to another characteristic, associated with each lever 2a, 2b is an individualized electrical contact 14. Thus a device with four levers 2a-d, such as shown in FIG. 12, makes it possible to produce four separate signals according to the lever 2a-d maneuvered, each maneuver in addition to providing said signal, modifying the position of the member 5.

The stroke of a lever 2a, 2b and of an associated tappet 3a, 3b is advantageously limited by an abutment.

FIGS. 4 and 5 detail an embodiment of a rocker 4. FIGS. 7 and 8 detail an embodiment of a tappet 3.

FIGS. 9a-d show the successive steps of an actuating sequence of a lever 2a of a device of which the member 5 is translatable.

Initially, in FIG. 9a, the member 5 is in one of the two positions thereof, here towards the left in the plane of the figure. The rockers 4a, 4b are, also in one of their stable extreme angular positions, here turned towards the left. The lever 2a is in its idle position.

In FIG. 9b, a touch is applied to the lever 2a. This actuates the associated tappet 3a downwards so as to actuate the associated rocker 4a. FIG. 9b shows an intermediate position, substantially at mid-stroke. FIG. 9c shows the end of the stroke, the touch being continued. The rocker 4a, under the action of the associated tappet 3a, rotates in the clockwise direction to reach its other stable extreme angular position, here turned towards the right. This change in position drives, via a cam 42 of the rocker 4a, the member 5 that changes position, from the left to the right, in translation. This movement actuates in turn a cam 42 of the rocker 4b that rotates in turn to reach its other stable extreme angular position, here turned towards the right.

If a rocker 4c is present, aligned in rotation with the rocker 4a, it is displaced directly by the rocker 4a, via a shaft 43. If a rocker 4d is present, aligned in rotation with the rocker 4b, it is displaced, via the member 5, by the rocker 4b, via a shaft 43.

Finally, in FIG. 9d, the touch on the lever 2a is released. Under the effect of the return means 21, the lever 2a, as well as all the other levers 2b, returns to the idle position thereof. The member 5 is now in the other position thereof, here towards the right, and this in a stable manner. The rockers 4a, 4b are, also, in the other position thereof, here turned towards the right.

A touch on any one of the levers, including the lever 2a, would cause a return of the device, member 5 and rockers 4a, 4b, to the initial configuration of FIG. 9a.

FIGS. 10a-d show the successive steps of an actuating sequence of a lever 2a of a device of which the member 5 is rotatable.

Initially, in FIG. 10a, the member 5 is in one of the two angular positions thereof, here rotated in the clockwise direction in the plane of the figure. The rockers 4a, 4b are, also, in one of their stable extreme angular positions, here turned towards the left. The lever 2a is in its idle position.

In FIG. 10b, a touch is applied to the lever 2a. This actuates the associated tappet 3a downwards in such a way as to actuate the associated rocker 4a. FIG. 10b shows an intermediate position, substantially at mid-stroke. FIG. 10c shows the end of the stroke, the touch being continued. The rocker 4a, under the action of the associated tappet 3a, rotates clockwise to reach its other stable extreme angular position, here turned towards the right. This change in position, drives in rotation, via an articulation, the member 5 which changes angular position, in an anti-clockwise rotation. This movement actuates in turn, via an articulation, the rocker 4b which rotates in turn to reach its other stable extreme angular position, here turned towards the right.

If a rocker 4c is present, aligned in rotation with the rocker 4a, it is displaced directly by the rocker 4a, via a shaft 43. If a rocker 4d is present, aligned in rotation with the rocker 4b, it is displaced, via the member 5, by the rocker 4b, via a shaft 43.

Finally, in FIG. 10d, the touch on the lever 2a is released. Under the effect of the return means 21, the lever 2a, as well as all the other levers 2b, returns to the idle position thereof. The member 5 is now in the other position thereof, here rotated in the anti-clockwise direction, and this in a stable manner. The rockers 4a, 4b are, also, in the other position thereof, here turned towards the right.

A touch on any one of the levers, including the lever 2a, would cause a return of the device, member 5 and bascules 4a, 4b, to the initial configuration of FIG. 10a.

Whereas a monostable device would require an actuating force of about 15 N, the bistable design proposed by the disclosure makes it possible to produce a device that can be maneuvered with a force of about 6 N. The device proposed also allows for a realization that has a total height less than 13 mm. The stroke of a lever 4a, 4b can be reduced to a value comprised between 2 and 3 mm. Indicatively, the angular clearance of a rocker 4 is about +/−15°.

The disclosure is described hereinabove by way of example. It is understood that those skilled in the art are able to carry out different alternative embodiments of the disclosure, by associating for example the different characteristics hereinabove taken individually or in combination, without however leaving the scope of the disclosure.

The invention claimed is:

1. A bistable device comprising
   a fixed baseplate,
   a first lever and a second lever,
   a first tappet associated with the first lever, a second tappet associated with the second lever, the first and second tappets integral with said respective first and second levers and disposed between the associated lever and the baseplate substantially aligned in a first direction, wherein the first and second levers are configured to be displaced relative to the baseplate so as to displace the associated tappet substantially in translation in the first direction,
   a member able to take two positions,
   a first rocker associated with the first lever, a second rocker associated with the second lever, the first and second rockers disposed between the baseplate and the associated tappet, the rockers each comprising two V-shapes which face the associated tappet, wherein a touch of the associated tappet in a first V-shape turns the associated rocker in a rocker direction and a touch of the associated tappet in a second V-shape turns the associated rocker in a direction opposite to the rocker direction,
   wherein each rocker is synchronised in a rotation and each rocker is synchronised with the member.

2. The device according to claim 1, wherein the first and second rockers turning around an axis of rotation are synchronised by a shaft connecting the first and second rockers, wherein the first and second rockers and the shaft are made from a same material.

3. The device according to claim 1, wherein the first and second rockers turning around separate axes of rotation are synchronised by a means of transmission confounded with the member.

4. The device according to claim 1, wherein the two positions of the member are rotatable around an axis perpendicular to the first direction or translatable in a second direction perpendicular to the first direction.

5. The device according to claim 1, wherein a relative disposition of the first and second V-shapes of the first and second rockers and the translation in the first direction of the associated tappet are such that rotation of the rocker obtained by the touch of the associated tappet in the first V-shape places the second V-shape facing the tappet in an idle position that is substantially aligned with the first direction, and wherein the rotation of the rockers obtained by touching the associated tappet in the second V-shape tends to place the first V-shape facing the associated tappet in the idle position.

6. The device according to claim 5, wherein the first and second V-shapes are moved away in a second direction substantially perpendicular to the first direction, so that the respective rocker turns, relative to the baseplate, around a first axis of rotation substantially perpendicular to the first direction and to the second direction.

7. The device according to claim 1, wherein at least one of the first and second rockers further comprises two feet, which face the baseplate and wherein the baseplate comprises two gutters each able to receive one of said feet rotatably.

8. The device according to claim 1, wherein at least one of the first and second rockers is substantially symmetric relative to an axis of symmetry, substantially aligned with the first direction.

9. The device according to claim 1, wherein axes of rotation of the first and second rockers are parallel.

10. The device according to claim 1, wherein the first and second rockers are similar and/or the first and second tappets are similar.

11. The device according to claim 1, wherein at least one of the first and second levers comprises a return means that moves the respective lever away from the associated rocker.

12. The device according to claim 6, wherein at least one of the first and second tappets is able to be displaced, relative to the associated lever, in rotation about a second axis substantially parallel to the first axis and comprises a return means in the idle position.

13. The device according to claim 1, wherein at least one of the first and second rockers and/or the member comprises at least one return means tending to place said at least one rocker and/or the member in one of the two positions thereof.

14. The device according to claim 13, wherein a touch on at least one of the first and second levers actuates an individualised electrical contact.

* * * * *